Patented Mar. 1, 1949

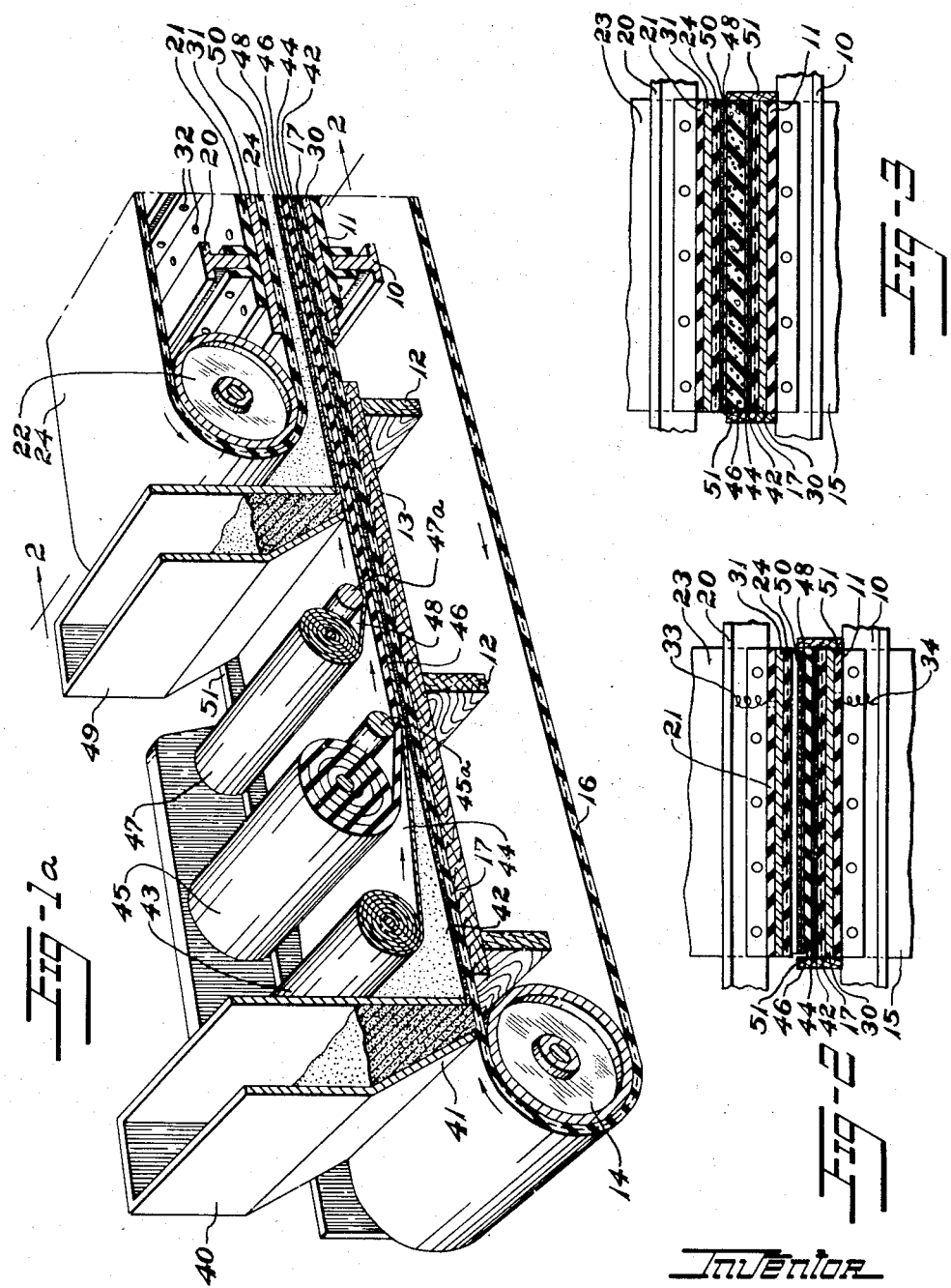

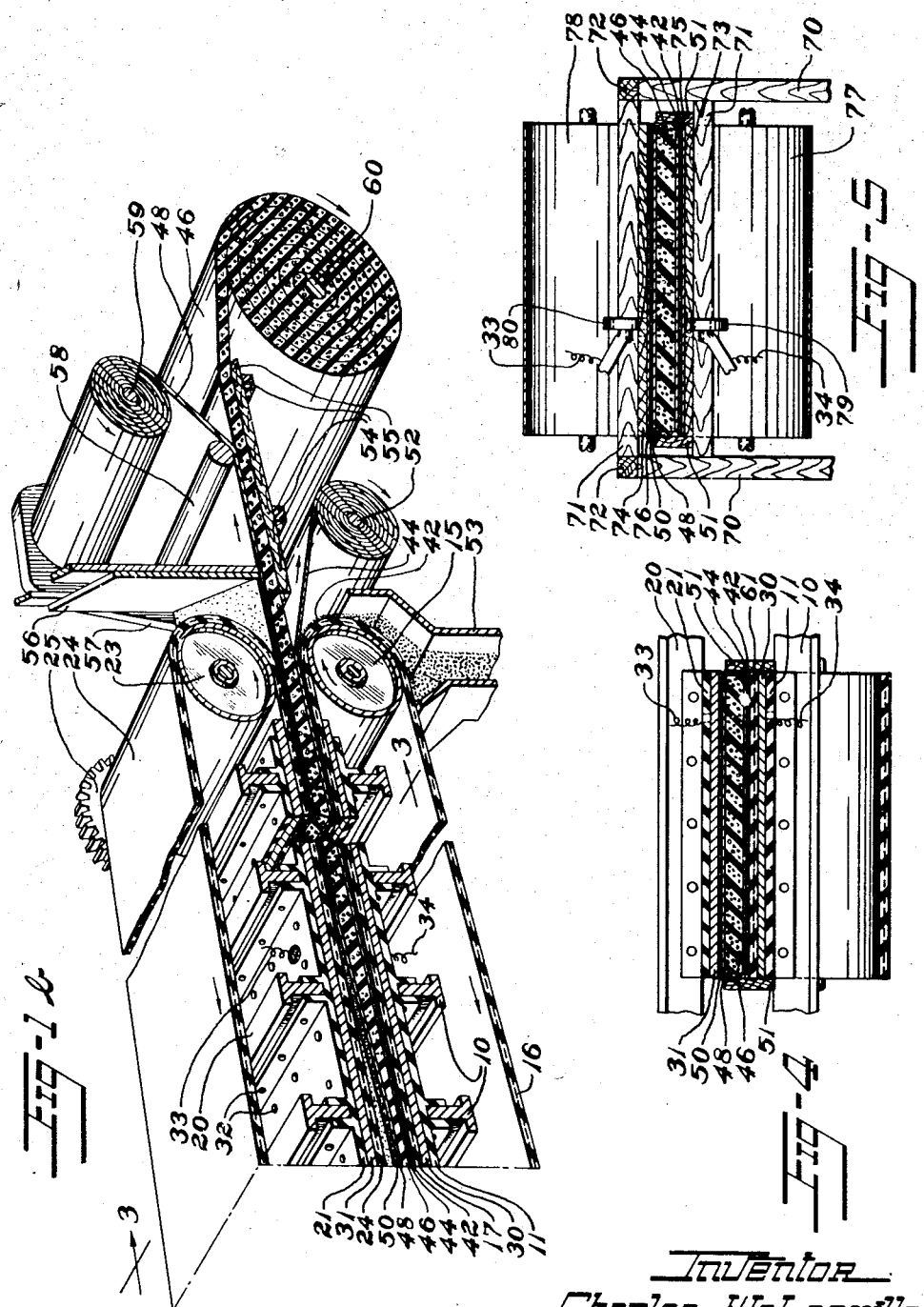

2,463,289

UNITED STATES PATENT OFFICE 2,463,289

METHOD AND APPARATUS FOR PRODUCING CELLULAR RUBBER MATERIAL

Charles W. Leguillon, Akron, Ohio, assignor to The B. F. Goodrich Company, New York, N. Y., a corporation of New York Application August 30, 1946, Serial No. 694,139

14 Claims. (Cl. 18—6)

This invention relates to the production of cellular rubber and to the production of articles of a cellular nature made from rubber and other rubber-like materials as well as other thermosetting materials. The invention particularly relates to methods and apparatus for the continuous production of sponge rubber articles.

Manufacturers of rubber sponge in the past have continually attempted to reduce the cost of their product. One of the simplest methods of reducing the per pound cost of rubber sponge commonly used was by means of the increased use of fillers. To reduce the per volume cost of sponge, much effort was also expended in developing blowing or sponging agents which gave increased porosity. It is well known that sponge rubber is one of the best sound deadeners and thermal insulating agents, but its cost is still prohibitive of many such uses. A substantial element of the high cost of sponge rubber is the cost of the mechanical and manual manufacturing operations used in producing the sponge, operations which have remained basically unchanged since the very beginnings of the rubber manufacturing art.

It is an object of this invention, therefore, to provide a method and apparatus for the production of rubber sponge which will produce sponge of rubber and other thermosetting materials which is both superior in properties and lower in cost.

It is a further object of this invention to provide methods and apparatus for the production in a continuous manner of rubber sponge in a variety of novel shapes and forms including flat sheets, tubing, webbing, stamped articles and the like, which heretofore have been manually produced only at a high cost.

The foregoing objects are achieved in this invention by covering with a finely-divided, dry, solid dielectric material such as soapstone, talc, and the like, a shaped body of rubber composition containing a blowing or sponging agent and moving the covered composition through a high frequency electrostatic field having characteristics such as to convert the composition to the blown cellular condition and to vulcanize the cellular composition. The rubber composition should preferably be unconfined, other than by the soapstone, during its passage through the electrostatic field. In this manner, a vulcanized sponge of maximum porosity is obtained. The finely-divided dielectric material permits free escape of the gases usually produced during blowing and vulcanization. Thus, a sponge is produced with a smooth surface unmarred by pitting and blowholes. Since the formation of blowholes is prevented, the sponge is of more uniform pore size and is stronger and more resilient than sponges heretofore made.

I have also found that when flat-surfaced sponge sheet, or die-cut or pre-shaped articles of flat configuration such as sponge gaskets are desired, it is desirable to cover the sponge compound on its flat transverse sides with a porous fibrous sheet material such as square-woven cotton fabric of large pore size, or coarse and porous paper. The fabric material or paper sheet tends to prevent substantial transverse expansion of the expanding rubber composition while permitting substantially free vertical expansion. In this manner, flat sheets of sponge of even thickness and smooth surface are easily produced. However, flat sheet sponge material may be produced without the use of fabric particularly where it is not necessary to hold the finished product within close dimensions and where the condition of the outside surface is immaterial.

The invention will now be described with further particularity with reference to certain preferred embodiments as illustrated in the accompanying drawings, of which:

Figs. 1a and 1b constitute a sectional elevational view in perspective of an illustrative embodiment of apparatus for carrying out the method of this invention.

Fig. 2 is a sectional view taken along the line 2—2 of Fig. 1a.

Fig. 3 is a sectional view taken along the line 3—3 of Fig. 1b.

Fig. 4 is a sectional view similar to those of Figs. 2 and 3 but showing in section a second illustrative embodiment of apparatus having but one conveyor belt to carry the rubber slab with its two plies of fabric and surrounding powdered dielectric material between the electrodes.

Fig. 5 is a sectional view similar to those of Figs. 2, 3 and 4 but showing in section a third illustrative embodiment of apparatus having two metal conveyor belts which function as electrodes and serve to transport the rubber slab with its two plies of fabric and surrounding powdered dielectric material.

Referring to Figs. 1a and 1b of the drawings, the apparatus shown therein comprises a framework of T-shaped cross supports 10, 10 which are bolted at the ends to upright leg members (not shown for reasons of clarity) so as to support a table-like bed 11 of electrical insulating material such as Bakelite, hard rubber, wood, or other suitable insulating material. Wooden cross supports 12, 12 supported by wooden leg members (not shown) support a similar table-like bed 13 which supplements bed 11 and serves as a table upon which the work is assembled. Adjacent the ends of the table-like beds 11, 13 are provided, respectively, pulley rolls 14, 15 which are journaled in upright leg members (not shown). A conveyor belt 16 travels over the pulley rolls 14, 15 so as to have its upper reach 17 travel in close contact over the beds 11, 13.

An upper supporting framework for supporting an upper conveyor belt is provided comprising T-shaped cross members 20, 20 similarly bolted to the upright leg members (not shown). The cross members 20, 20, support another table-like electrode-supporting member 21 of insulating material, which is substantially parallel and coextensive with the lower bed 11. At the ends of the framework for supporting the upper table-like surface 21 are provided pulley rolls 22, 23 over which travels an upper conveyor belt 24. The rolls 22, 23 are likewise journaled in the upright leg members not shown.

The roll 15 is driven by a source of motive power (not shown) driving a gear on the end thereof. The upper driven roll 23 is driven from the gear on roll 15 by means of a gear 25 meshing therewith. The gears on rolls 15, 23 should be of the same size and have the same number of teeth so as to drive the belts 16, 24 at substantially the same speed.

Two plate-like electrodes 30, 31 are secured respectively to the bed 11 and to the upper supporting member 21 by screws 32, 32. The electrical bus bar connections to the respective electrodes are indicated symbolically at 33, 34. High frequency alternating current is supplied to the electrode plates from any convenient source such as an oscillator tube type generator (more frequently called an electronic generator).

At one end of the machine and disposed above the wooden table top 13 are provided three let-off rolls for supplying the rubber-like material and textile fabric or paper synchronously with belt 16. Also provided are one or more hoppers for spreading powdered soapstone or other freely flowable powdered dielectric material on the lower belt and over the top of the rubber-like material on the belt 16. In the apparatus illustrated, a hopper 40 is provided having a tapered mouth or spout 41 for laying down an even thin layer 42 of soapstone on the belt 16. Next is provided a let-off roll 43 which lays down a ply 44 of textile fabric or paper on top of the soapstone layer 42. A second let-off roll 45 is provided from which a calendered sheet 46 of rubber containing a blowing agent is laid down. Immediately following the let-off roll 45 there is provided a guiding or idler roll 45a for smoothing and tensioning the rubber sheet 46. A third let-off roll 47 lays down a second ply 48 of paper or textile fabric on top of the sheet of rubber 46 and the guiding or idler roll 47a smooths and tensions the top layer 48. Adjacent the conveyor belts 16, 24 is located a second similar soapstone hopper 49 which covers the three plies of material with a thin even layer 50 of soapstone or other powdered dielectric. The thus-covered rubber-like material advances with the belt 16 and passes beneath the top belt 24.

Referring to Figs. 1a and 2 of the drawings, it will be seen that in the first stages of the travel of the material between the electrodes there remains an unfilled space between the top layer 50 of soapstone and the top electrode 31. As the belts 16, 24 advance the material between the electrodes, the rubber material begins to slowly expand until in the later stages of travel between the electrodes the rubber layer 46 has expanded sufficiently to substantially fill the vacant space between the electrodes, as will appear more clearly in the cross sectional view of Fig. 3. If the spongy rubber continues to expand, it is seen that a portion of the top layer 50 of soapstone may be squeezed out from between the rubber and the electrodes to permit further expansion.

In order to restrain the transverse expansion of the rubber sheet 46, the apparatus may be provided with side boards 51, 51 which may be high enough to extend to the top or slightly above the expanded rubber sheet 46 but permitting the free escape of soapstone squeezed from between the electrodes 30, 31 by the expansion of the sponge rubber. The gases ordinarily generated during the vulcanization of rubber may thus escape through the fabric plies and be liberated to the atmosphere through the soapstone layer. Furthermore, the excess of gases generated by the blowing agent is also able to freely escape in the same manner thereby preventing the accumulations of gases usually resulting in the formation of skin blisters and blowholes and tends to produce a sponge rubber of more uniform pore size and greater strength.

At the discharge end of the apparatus wind-up rolls are provided to roll up the finished sponge slab and the fabric or paper layers. Immediately adjacent the pulley 15 and slightly below the level of the bed 11 there is provided a wind-up roll 52 for winding up the lower fabric or paper ply 44. Also adjacent the pulley 15 in a position to receive the lower soapstone layer 42 as it falls off the end of the lower belt 16 is provided a soapstone-receiving hopper 53.

Beyond the pulley 15 and on the same level as the bed 11 is provided a short extension table comprising wooden cross members 54 and a wooden top 55 over which the rubber ply 46 slides after the lower fabric ply 44 and soapstone layer 42 have been removed. Above the table top 55 a scraper blade 56 is disposed in a plane oblique to the direction of travel of the upper fabric or paper layer 48, with its lower edge closely adjacent to layer 48 so as to scrape the upper layer of soapstone 50 to one side where it falls into a chute 57 which conveys the soapstone down into the hopper 53. The soapstone in hopper 53 may be returned to the head of the apparatus for reuse. Behind the scraper blade 56 is provided a smoothing and tensioning roll 58 for maintaining tension in the material passing under the scraper blade 56. Above the tensioning roll 58 is provided a wind-up roll 59 for winding up the top fabric layer 48. At the end of and slightly below the wooden top 55 is provided a product wind-up roll 60 for winding up the sponge slab 46.

Fig. 4 of the drawings shows in sectional view an alternative, more simple form of apparatus for continuously producing sponge rubber slab material according to the method of this invention. In this form of apparatus, the upper conveyor belt 24 has been dispensed with, the fabric and powder-covered rubber material being conveyed between the electrodes on a single conveyor belt 61. This form of apparatus operates very satisfactorily though more care has to be exercised to keep the various plies of materials smooth and straight, for if the material is accidentally displaced and makes rubbing contact with the upper stationary electrode in the softened condition, snagging and binding is apt to result such as to cause shut downs in order to straighten the material out again. In this form of apparatus, the essential structural elements are otherwise the same, namely, the T-shaped cross supports 10, the insulating table-like bed 11 to which is secured the lower electrode 30, the conveyor belt 61 which supports the lower soapstone layer 42, the lower fabric ply 44, the sheet of rubber 46, the top fabric layer 48, and the top soapstone layer 50. The top electrode 31 is secured to the upper supporting bed or surface 21 which in turn is secured to the upper framework of T-shaped cross members 20, 20. Similarly, the apparatus may or may not be provided with guide boards 51, 51. With this form of apparatus, the same or other combinations of let-off rolls, powdered dielectric hoppers, and wind-up rolls are provided as in the first-described form of apparatus.

The apparatus of this invention may be provided with certain structural modifications to improve the operation of the apparatus, reduce power requirements and improve the product quality. Fig. 5 of the drawings shows in section another alternative form of apparatus to carry out the method of this invention. Referring to Fig. 5, it will be seen that the usual framework of the apparatus is provided comprising leg members 70, 70 and cross support members 71, 71 and longitudinal support members 72, 72 which may be made of wood as shown in the drawing. The members 70, 71, 72 form a supporting framework for two insulating plates 73, 74 which serve respectively as surfaces against which two metal conveyor belts 75, 76 are slidably supported. The belts 75, 76 travel over pulley rolls 77, 78 as in the other above-described embodiments of the apparatus. The metal conveyor belts 75, 76, preferably made of flexible copper or aluminum, also serve as the electrodes in the apparatus thus effectively eliminating the power-absorbing capacity of a conveyor belt of fabric or other insulating material. The effective electrical faces of the electrodes are thus brought closer together reducing the voltage required to produce a given field strength. The apparatus of Fig. 5 may be similarly provided with guiding side boards 51, 51 to restrain the transverse expansion of the rubber sponge slab 46. The apparatus may also be provided with similar sets of let-off rolls, powder hoppers and wind-up rolls for supplying the plied material to the machine and for carrying away the finished product. The electrical connections to the moving belt-electrodes 75, 76 are indicated symbolically with the electrical contact wheels 79, 80 making rolling contact respectively with the belts 75, 76.

The method of the invention will now be described with reference to certain specific examples.

EXAMPLE I

Rubber sponge sheet $\frac{7}{16}$ of an inch thick was produced by the method of this invention from a calendered reclaimed rubber composition $\frac{5}{32}''$ in thickness. Apparatus similar to that of Fig. 4 was adjusted to have a space of ¾ of an inch between the electrodes. The single conveyor belt used was of woven duck fabric approximately ⅛ of an inch in thickness. A thin layer of soapstone ⅛ inch in thickness was laid down on the belt, then a thin but strong ply of kraft paper of the type used for wrappings was laid down on the soapstone before the $\frac{5}{32}$ inch thickness of rubber was laid down. A second similar ply of paper was laid down on top of the rubber, followed by about ⅜ inch of soapstone to nearly fill the space between the electrodes. The voltage applied to the electrodes was approximately 3000 volts at a frequency of between 12 and 14 megacycles. It was found that the following reclaimed rubber sponge composition required from four to 19 minutes exposure to the effects of the high-frequency electrostatic field to effect blowing and vulcanization. Particularly good results were obtained in from 5 to 8 minutes.

*Sponge composition*

| Ingredient | Parts by Weight |
|---|---|
| Whole Tire Reclaim | 161.5 |
| Whiting | 25.0 |
| Zinc Oxide | 4.0 |
| Phenyl beta naphthylamine | 2.0 |
| Retarder (phthalic anhydride) | 4.0 |
| Sulfur | 3.0 |
| Mineral oil softener | 23.0 |
| Fatty Acid | 12.0 |
| Sodium Bicarbonate | 12.0 |
| Tolyl mercaptan | 1.0 |
| Dibenzothiazyl disulfide | 1.0 |

EXAMPLE II

A sponge of neoprene (polychloroprene) was made according to the method of this invention using generally the same voltage and frequency as in Example I. The calendered neoprene sheet had an original thickness of $\frac{7}{64}$ of an inch and when fully blown and vulcanized the thickness of the sponge slab was approximately ⅜ inch.

The neoprene sponge composition was as follows:

| Ingredient | Parts by Weight |
|---|---|
| Neoprene (GRM) | 100.0 |
| Phenyl beta naphthylamine | 2.0 |
| Channel Black | 5.0 |
| Zinc Oxide | 5.0 |
| Light Magnesium Oxide | 10.0 |
| Sodium Bicarbonate | 15.0 |
| Blanc Fix | 10.0 |
| Petrolatum softener | 3.0 |
| Mineral Oil softener | 20.0 |

The conveyor belt was covered with ⅛ inch of soapstone, then a ply of paper of the ordinary wrapping type was laid on both sides of the sponge composition followed by approximately ½ inch of soapstone over the top of the material. Sideboards of glass, approximately ½ inch high were used in this experiment to restrain the transverse expansion of the rubber and to produce a slab of sponge having generally square corners. It was found that neoprene was generally slower in its reaction to the high-frequency electrostatic field than the reclaimed sponge of Example I, the neoprene composition given above requiring from 8 to 24 minutes' exposure to the high-frequency electrostatic field to effect blowing and vulcanization. The sponge slab was smooth and of even pore size with freedom from pits, blowholes and other similar defects. Care must be exercised with neoprene compositions in general, however, to prevent occasional burning due to too high a power concentration in the vulcanization steps. If the power input is reduced and more time allowed for the vulcanization, this latter difficulty may be minimized in the continuous production of slab sponge from neoprene synthetic rubber.

Example III

A composition similar to the composition given in Example I was used to produce a slab of sponge approximately four inches wide. No sideboards were used and it was found that the edges were generally round and slightly irregular in outline but that the amount to be trimmed away to produce a neat sponge slab was not excessive. The original sheet of reclaimed rubber composition was $\frac{3}{16}$ inch thick and after blowing and vulcanization, it was found that the sponge slab was ½ inch thick. This electronically-cured sponge slab was considerably more resilient and exhibited much more uniform pore size than a steam-heated, mold-vulcanized sample of the same rubber composition. The voltage used for this sample was 3.025 kv. and the frequency was adjusted to 13 megacycles.

In carrying out the method of this invention, the conveyor belts used to transport the rubber material through the high-frequency electrostatic field may be of woven fabric material such as woven cotton duck, woven asbestos or spun glass wool, and similar dielectric materials. When such dielectric belts are used, it is necessary to provide a pair of stationary metal electrodes of elongated configuration. The preferred form of apparatus, however, is provided with two metal conveyor belts made of copper or aluminum. The metal conveyor belts may be made either of thin pliable sheet metal such as aluminum or copper or may be made in the form of tightly woven wire mesh of copper or aluminum of the type which will support the finely-divided soapstone material.

The finely-divided dielectric material which may be used to surround the stock to be blown and vulcanized or thermo-cured may be any dielectric material of such particle size and shape as to insure free flowability such as is obtained with talc, soapstone, ground wood flour, powdered mica, powdered silica gel, finely-divided clays or other powdered ceramic materials such as powdered calcined clay, fine sea sand, and the like. Generally, it has been found that best results are obtained when the finely-divided dielectric material will pass a 20 mesh screen. Desirably a dielectric material should be chosen which has dielectric heating characteristics closely like those of the rubber-like material being heated so that the rubber and powdered dielectric material will be heated at substantially the same rate in the electrostatic field. The ideal condition is to have the powdered dielectric material heat at the same rate or slightly slower than the rubber, a condition which is admirably fulfilled by the preferred powdered soapstone. The other materials mentioned as well as numerous additional ones, as is well known, have dielectric heating properties sufficiently close to those of rubber to have considerable value in the invention. The physical properties of the material, and especially its particle size and particle shape characteristics, should be such as to insure free flowability in order to readily flow about and conform to the outlines of the rubber body to provide a continuous covering therefor.

Although its effects are not fully understood, the powdered soapstone or other finely-divided solid dielectric material is believed to perform several different functions in the invention. It provides actual physical support for the unvulcanized rubber during the early stages of vulcanization and at the same time appears to act as a screen or spreading means to distribute the heating effect of the electrostatic field evenly over the irregular contours frequently encountered in shaped rubber articles. Inasmuch as the dielectric heating characteristics of the rubber and soapstone are closely similar, the rubber need not be accurately positioned with respect to the electrodes but may assume various positions within the mass of soapstone without producing uneven heating which otherwise might result. Also, the soapstone and rubber, though dielectric in nature, actually do conduct some current at high frequencies and the soapstone again serves to even out this current flow and prevents its being concentrated at a few points in the cross section of the rubber composition with resulting localized overheating or burning of the rubber. Further, the covering of finely-divided material prevents air oxidation of the rubber while it is at elevated temperatures since it effectively excludes the atmosphere from contact with the rubber being vulcanized. Another function of the powdered dielectric material is to assist in saving power by conserving heat previously imparted to the rubber during extrusion or calendering operations so that the heat may be utilized for vulcanization. In one embodiment of this invention, the rubber material may be supplied directly to the dielectric vulcanization apparatus from a rubber calender or extrusion machine instead of from let-off rolls as disclosed in the drawings. Heretofore, the common manufacturing methods have allowed the stock to cool before it is placed in the vulcanization apparatus. In this process, an extruded or calendered product is covered immediately with the hot powdered dielectric material while the stock itself is still hot from the extruder or calender so that the heat in the stock is retained and effectively utilized during vulcanization.

It will be appreciated that the extruded or calendered strip or body of rubber to be heated is supported wholly by a dry flowable dielectric material in which it is free to move lengthwise and vertically in response to shrinkage or expansive tendencies during vulcanization, except, as pointed out it may be found desirable in some instances to inhibit the lateral or transverse expansion in order to produce a sponge slab having straight sides and square corners. The rubber may not improperly be said to float in the dry powder, substantially free to fully expand during the dielectric vulcanization. The substantial lack of confinement contributes to the attainment of maximum volume from a given quantity of rubber composition and aids in attaining this maximum expanded volume without the formation of large blowholes and the like, for the gases generated during the blowing of the rubber may freely distill through the soapstone during the vulcanization.

Any appropriate generator or source of high-frequency oscillating or alternating currents may be employed and the frequency of the current may vary widely as required by the various conditions encountered in manufacturing operations. Generally, however, the frequency will be greater than about one million cycles per second (one megacycle) and may be as high as a hundred, two hundred or three hundred million cycles per second (100, 200 or 300 megacycles), or more. Voltages, power input, and the like also will be varied and controlled in the usual manner, the details of which are well understood and form no part of the present invention.

This invention has made possible a continuous method of producing cellular articles of rubber and other thermosetting materials and has made possible the realization of great savings in time, labor and materials. Sponge rubber sheets and strips and shaped articles of sponge may be continuously produced without the necessity of supporting the sponge within molds or using autoclaves during cure. For instance, in the making of sponge gaskets, washers, vibration and sound dampener strips and the like where it has been the custom to put a piece of the sponge rubber mix into a mold and subsquently trim the molded article, it is now possible to cut or stamp out the gaskets, washers etc. or continuously extrude the dampener strips and then vulcanize these preshaped articles in apparatus according to the method of this invention. The remainder of the sheet from which the stampings were made may be resheeted for further cutting of articles therefrom. A savings in material of up to 33⅓ percent or more can be achieved in this fashion.

The method of this invention improves the age-resistance of sponge rubber because the overcure of surface layers usually encountered in steam-curing of rubber products is eliminated by the "inside-out" heating of the high-frequency field. Furthermore, a stronger, more cohesive sponge rubber is produced, firstly, because faster and tighter curing rubber compositions may be used in the method of this invention than can be used in conventional vulcanization methods (because of the above-mentioned surface overcure) and secondly, the effects of the high-frequency electrostatic field seem to produce a stronger product from a given rubber composition than do more conventional methods. In addition, the surface oxidation suffered by vulcanizable materials when cured in contact with air is eliminated, since the powdered dielectric material used in this invention effectively excludes the atmosphere from contact with the vulcanizable or thermosetting material while it is at elevated temperatures. Also, the method of this invention produces an article of cellular rubber having a tight, smooth skin which for many uses is highly desirable since the pores are closed and a smooth surface is presented which is highly desirable when it is necessary to adhesively secure other materials to the sponge.

The sponge-producing substances which may be converted to the cellular condition by the method of this invention include any thermo-softening dielectric material which softens sufficiently upon application of heat to permit cells or pores to be blown therein. Among such materials are, for example, A-stage or B-stage thermosetting resins such as phenol-aldehyde or urea-formaldehyde resins, together with the well-known thermoplastic resins and natural and synthetic rubber. Particularly useful products are readily obtained by the process of this invention by employing rubber-like materials as the basis for the sponge; among such materials are rubber-like plasticized polymers or copolymers of vinyl halides or esters, vinylidene halides, acrylic esters, methacrylic esters, styrene, and the like, as well as natural or synthetic rubber.

This invention has been found to be particularly suitable for making sponge from a vulcanizable rubber, such as caoutchouc, balata, gutta percha, reclaimed rubber and such synthetic rubbers as neoprene (poly-chloroprene), copolymers of butadiene-1,3 hydrocarbons with compounds containing a single olefinic double bond copolymerizable therewith, and similar vulcanizable rubbers.

It will be understood that the principles herein disclosed are applicable generally to the production of sponge from all types of rubber and synthetic rubber-like materials and the other similar dielectirc plastic compositions hereinabove set forth which have sufficient coherence prior to setting to be handled and from which a cellular material may be produced. It is consequently not the intention to limit the invention to the treatment of any specific type of vulcanizable or thermosetting material unless otherwise indicated by the claims.

While the invention has been described with particular reference to certain preferred embodiments thereof, it is possible to make variations and modifications therein without departing from the spirit and scope of the invention as defined in the appended claims.

I claim:

1. The method which comprises transporting a solid body of unvulcanized but vulcanizable rubber-like material containing a sponging agent between a pair of opposed electrodes on a layer of finely-divided, freely flowable dry solid dielectric material, covering said body in advance of its passage between said electrodes with a layer of said finely-divided dielectric material partially filling the remaining space between said electrodes, supplying a high-frequency alternating current to said electrodes until said unvulcanized material has been converted to the cellular vulcanized condition substantially filling the remaining space between said electrodes, and separating said dielectric material from said vulcanized rubber-like material after it has been transported between said electrodes.

2. The method of producing continuous lengths of cellular rubber-like material which comprises causing a continuous solid strip of unvulcanized but vulcanizable rubber-like material containing a sponging agent to travel between a pair of electrodes, spaced apart by a distance greater than the thickness of said strip progressively supplying a finely-divided dry solid dielectric material about said strip to fill only partially the remaining space between said electrodes, and establishing a high-frequency alternating electrostatic field between said electrodes to heat said strip and to effect blowing of said vulcanizable material in the course of its travel between the electrodes until said dielectric-covered vulcanizable material substantially fills the space between said electrodes and said strip has been converted to vulcanized cellular rubber, the strip of vulcanizable material being substantially unconfined during such blowing and vulcanization except for the weight of said dry dielectric material.

3. The method which comprises disposing a solid body of unvulcanized but vulcanizable rubber-like material containing a sponging agent between plies of a porous fabric material, embedding said fabric-covered body of rubber-like material in a freely flowable, finely-divided dry solid dielectric material, causing said embedded body to travel between a pair of opposed electrodes spaced apart by a distance greater than the total thickness of said fabric-covered body and said dielectric material, and establishing a high-frequency electrostatic field between said electrodes to heat said body to effect conversion of said rubber-like material to the cellular condition and to effect vulcanization of said rubber-like material in said cellular condition.

4. The method which comprises forming a shaped body of unvulcanized but vulcanizable solid rubber-like material containing a sponging agent, progressively covering said body with a freely flowable, finely-divided, dry solid dielectric material, progressively passing said covered body of rubber-like material between plane parallel electrodes spaced wide enough apart to permit considerable expansion of said rubber-like material and establishing a high-frequency electrostatic field between said electrodes to seat said body to convert said rubber-like material to the cellular condition and to vulcanize said rubber-like material in said cellular condition, a substantial portion of said powdered dielectric material being exposed to the atmosphere to permit escape of gases resulting from the action of the sponging agent and from vulcanization.

5. The method which comprises progressively forming in a continuous manner a shaped body of an unvulcanized but vulcanizable solid rubber-like material containing a sponging agent, progressively advancing said body in a continuous manner, progressively covering said body with a freely flowable, finely-divided dry solid dielectric material, and establishing a high-frequency electrostatic field in a zone traversed by the said covered body during its progressive advance to heat said body to expand it to a cellular condition and to vulcanize it in said expanded condition.

6. The method which comprises progressively forming in a continuous manner a shaped solid body of unvulcanized but vulcanizable material, progressively advancing said strip in a continuous manner, progressively applying plies of a porous fabric material to said body, progressively flowing a freely flowable, finely-divided, dry solid dielectric material about said fabric-covered rubber-like material, and establishing a high-frequency electrostatic field in a zone traversed by the covered body of rubber-like material during its progressive advance to heat said body to convert said rubber-like material to a cellular condition and to vulcanize said rubber-like material in the cellular condition.

7. The method which comprises progressively forming in a continuous manner a shaped solid body of unvulcanized but vulcanizable rubber-like material containing a sponging agent, progressively advancing said body in a continuous manner, progressively applying plies of a porous fabric material to said body, covering said body as it advances by pouring freely flowable, finely-divided, dry solid dielectric material about said fabric covered body, establishing a high-frequency electrostatic field in a zone traversed by said body during its progressive advance to heat said body to convert said rubber-like material to the vulcanized cellular condition, collecting said finely-divided dielectric material after it has traversed said zone and returning said finely-divided dielectric material for re-use in covering said body entering said zone, and removing said porous fabric material from said body after it has traversed said zone.

8. The method which comprises advancing a solid body of unvulcanized but vulcanizable rubber-like material containing a sponging agent between electrodes spaced apart by a distance greater than the thickness of said body, progressively flowing finely-divided dry solid dielectric material about said body to fill only partially the remaining space between said electrodes, and maintaining a high-frequency alternating electrostatic field between said electrodes to heat said body until it is converted to a cellular vulcanized condition substantially filling the remaining space between said electrodes.

9. The method which comprises advancing a traveling support between a pair of spaced opposing electrodes, progressively feeding a shaped solid body of unvulcanized but vulcanizable rubber-like material containing a sponging agent in spaced relation above said support and between said electrodes, progressively flowing finely-divided dry solid dielectric material onto said support and about said body to surround said body and leave space for expansion thereof between said electrodes, and establishing a high-frequency alternating electrostatic field between said electrodes to heat said body during its passage therebetween to convert said rubber-like material to a vulcanized cellular condition.

10. Apparatus for heating a body of dielectric material comprising a pair of spaced opposing electrodes, one of said electrodes including conveyor means for supporting and advancing said body between said electrodes, means for flowing dry solid finely-divided dielectric material about said body on said conveyor means, means for establishing a high-frequency alternating electrostatic field between said opposing electrodes to heat said body as it is advanced therebetween, and means for separating said finely-divided dielectric material from said body after passage between said electrodes.

11. Apparatus for heating a body of plastic material comprising a metallic conveyor belt having a generally horizontal reach, the horizontal reach of said belt being adapted to support and advance said body, means for embedding said body on said reach of belt in a mass of finely-divided freely flowable dry solid dielectric material, means for heating said body while so embedded and supported on said reach including an upper electrode disposed on the opposite side of said body from the reach of said belt and opposed thereto and means for establishing a high-frequency alternating electrostatic field between said electrode and the horizontal reach of said belt, means for advancing the reach of said belt to transport said embedded body through said field, and means for separating said finely-divided dielectric material from said body after passage through said field.

12. Apparatus for heating a body of plastic material comprising an endless flexible metallic conveyor means for transporting said body of plastic material through a heating zone, means for depositing said body on said conveyor means, means for flowing dry solid finely-divided dielectric material about said body in advance of its passage through said heating zone, means for advancing said conveyor with said body and said dielectric material, means for heating a zone through which said body is transported, said means including an electrode opposed to said conveyor on the opposite side of said body from said conveyor and means for establishing a high-frequency alternating electrostatic field between said electrode and said conveyor, and means for separating said finely-divided dielectric material from said body.

13. The method which comprises advancing a shaped body of unvulcanized but vulcanizable solid rubber-like material containing a sponging agent between electrodes spaced apart by a distance greater than the thickness of said body, covering said body with a mass of freely flowable finely-divided dry solid dielectric material having substantially the same dielectric heating characteristics as said body to fill only partially the remaining space between said electrodes, and maintaining a high-frequency alternating electrostatic field between said electrodes to heat said covered body until it is converted to a cellular vulcanized condition substantially filling the remaining space between said electrodes.

14. The method which comprises disposing a solid body of unvulcanized but vulcanizable material containing a sponging agent between plies of a porous fabric material, embedding said fabric-covered body of rubber-like material in a mass of freely flowable finely-divided dry solid dielectric material having substantially the same dielectric heating properties as said fabric-covered body, causing said embedded body to travel between opposed electrodes spaced apart by a distance greater than the total thickness of said fabric-covered body and said dielectric material, and establishing a high-frequency electrostatic field between said electrodes to heat said body to effect conversion of said rubber-like material to a cellular condition and to effect vulcanization of said rubber-like material in said cellular condition.

CHARLES W. LEGUILLON.

REFERENCES CITED

The following references are of record in the file of this patent:

UNITED STATES PATENTS

| Number | Name | Date |
|---|---|---|
| 1,162,397 | Price | Nov. 30, 1915 |
| 1,370,805 | Flemming | Mar. 8, 1921 |
| 1,484,731 | Malm | Feb. 26, 1924 |
| 1,608,727 | Dickey | Nov. 30, 1926 |
| 1,924,635 | Buffington | Aug. 29, 1933 |
| 1,943,101 | Wheatley | Jan. 9, 1934 |
| 2,072,597 | Keen et al. | Mar. 2, 1937 |
| 2,223,476 | Amstuz | Dec. 3, 1940 |
| 2,232,109 | Gibbons | Feb. 18, 1941 |
| 2,280,771 | Dufour et al. | Apr. 28, 1942 |
| 2,315,366 | Daley et al. | Mar. 30, 1943 |
| 2,319,042 | De Wyk, Jr. | May 11, 1943 |
| 2,325,903 | Blair et al. | Aug. 3, 1943 |
| 2,421,097 | Lakso | May 27, 1947 |
| 2,423,902 | Peterson | July 15, 1947 |

FOREIGN PATENTS

| Number | Country | Date |
|---|---|---|
| 517,798 | Great Britain | Feb. 8, 1940 |